United States Patent
Kray et al.

(10) Patent No.: US 10,760,428 B2
(45) Date of Patent: Sep. 1, 2020

(54) FRANGIBLE GAS TURBINE ENGINE AIRFOIL

(71) Applicant: General Electric Company, Schenectady, NY (US)

(72) Inventors: Nicholas Joseph Kray, Mason, OH (US); Nitesh Jain, Bangalore (IN)

(73) Assignee: General Electric Company, Schenectady, NY (US)

( * ) Notice: Subject to any disclaimer, the term of this patent is extended or adjusted under 35 U.S.C. 154(b) by 130 days.

(21) Appl. No.: 16/161,296

(22) Filed: Oct. 16, 2018

(65) Prior Publication Data

US 2020/0116028 A1    Apr. 16, 2020

(51) Int. Cl.
| F01D 5/14 | (2006.01) |
| F01D 5/28 | (2006.01) |
| F01D 21/04 | (2006.01) |

(52) U.S. Cl.
CPC ............. *F01D 5/147* (2013.01); *F01D 5/141* (2013.01); *F01D 5/282* (2013.01); *F01D 21/045* (2013.01); *F05D 2220/36* (2013.01); *F05D 2240/303* (2013.01); *F05D 2240/305* (2013.01); *F05D 2240/306* (2013.01); *F05D 2300/603* (2013.01)

(58) Field of Classification Search
None
See application file for complete search history.

(56) References Cited

U.S. PATENT DOCUMENTS

| 3,096,930 | A | 7/1963 | Meyerhoff |
| 3,156,808 | A | 11/1964 | Davies et al. |
| 3,175,804 | A | 3/1965 | Bunger |
| 3,394,918 | A | 7/1968 | Wiseman |
| 3,626,568 | A | 12/1971 | Silverstein et al. |
| 3,761,201 | A | 9/1973 | Silverstein et al. |
| 4,000,956 | A | 1/1977 | Carlson et al. |
| 4,022,540 | A | 5/1977 | Young |
| 4,022,547 | A | 5/1977 | Stanley |
| 4,043,703 | A | 8/1977 | Carlson |
| 4,071,184 | A | 1/1978 | Carlson et al. |
| 4,111,600 | A | 9/1978 | Rothman et al. |
| 4,426,193 | A | 1/1984 | Carlson |
| D273,037 | S | 3/1984 | Dodge |

(Continued)

FOREIGN PATENT DOCUMENTS

| CN | 103628923 B | 3/2016 |
| EP | 0526057 A1 | 2/1993 |

(Continued)

*Primary Examiner* — Woody A Lee, Jr.
*Assistant Examiner* — Jason G Davis
(74) *Attorney, Agent, or Firm* — Dority & Manning, P.A.

(57) ABSTRACT

An airfoil defining a span extending between a root and a tip and a chord at each point along the span extending between a leading edge and a trailing edge. The airfoil includes a leading edge sheath coupled to the leading edge of the airfoil. The leading edge sheath includes a flange extending from a frangible line toward the tip along the span and defining a first width along the chord at each point along the span S. The leading edge sheath further includes a base extending from the frangible line at least partially along the span to the root and defining a second width along the chord at a point along the span of the frangible line such that the second width is greater than the first width.

20 Claims, 4 Drawing Sheets

(56) References Cited

U.S. PATENT DOCUMENTS

| | | |
|---|---|---|
| 4,971,641 A | 11/1990 | Nelson et al. |
| 5,112,194 A | 5/1992 | More |
| 5,123,813 A | 6/1992 | Przytulski et al. |
| 5,129,787 A | 7/1992 | Violette et al. |
| 5,141,400 A | 8/1992 | Murphy et al. |
| 5,222,297 A | 6/1993 | Graff et al. |
| 5,269,658 A | 12/1993 | Carlson et al. |
| 5,363,554 A | 11/1994 | Partridge et al. |
| 5,375,978 A | 12/1994 | Evans et al. |
| 5,392,514 A | 2/1995 | Cook et al. |
| 5,449,273 A | 9/1995 | Hertel et al. |
| 5,486,096 A | 1/1996 | Hertel et al. |
| 5,520,532 A | 5/1996 | Reinfelder et al. |
| 5,580,217 A | 12/1996 | Richards et al. |
| 5,738,491 A | 4/1998 | Lee et al. |
| 5,836,744 A | 11/1998 | Zipps et al. |
| 5,843,354 A | 12/1998 | Evans et al. |
| 5,844,669 A | 12/1998 | Wang et al. |
| 5,908,285 A | 6/1999 | Graff |
| 5,935,360 A | 8/1999 | Griggs |
| 5,939,006 A | 8/1999 | Wang et al. |
| 6,146,099 A | 11/2000 | Zipps et al. |
| 6,241,469 B1 | 6/2001 | Beeck et al. |
| 6,290,895 B1 | 9/2001 | Wang et al. |
| 6,294,113 B1 | 9/2001 | Woodmansee et al. |
| 6,402,469 B1 | 6/2002 | Kastl et al. |
| 6,413,051 B1 | 7/2002 | Chou et al. |
| 6,516,865 B1 | 2/2003 | Beeck et al. |
| 6,709,230 B2 | 3/2004 | Morrison et al. |
| 6,843,565 B2 | 1/2005 | Evans et al. |
| 7,114,912 B2 | 10/2006 | Gerez et al. |
| 7,736,130 B2 | 6/2010 | Schilling et al. |
| 7,780,410 B2 | 8/2010 | Kray et al. |
| 7,794,197 B2 | 9/2010 | Thompson et al. |
| 7,837,446 B2 | 11/2010 | McMillan |
| 7,972,109 B2 | 7/2011 | Crall et al. |
| 8,038,408 B2 | 10/2011 | McMillan |
| 8,083,487 B2 | 12/2011 | Wood et al. |
| 8,100,662 B2 | 1/2012 | Schreiber |
| 8,109,734 B2 | 2/2012 | Backhouse |
| 8,146,250 B2 | 4/2012 | Moroso |
| 8,234,990 B2 | 8/2012 | Xie et al. |
| 8,251,640 B2 | 8/2012 | Beckford et al. |
| 8,366,378 B2 | 2/2013 | Beckford et al. |
| 8,459,955 B2 | 6/2013 | McMillan et al. |
| 8,573,936 B2 | 11/2013 | Lafont |
| 8,647,072 B2 | 2/2014 | McMillan |
| 8,685,297 B2 | 4/2014 | Schreiber |
| 9,085,989 B2 | 7/2015 | Shah et al. |
| 9,157,139 B2 | 10/2015 | Rajagopalan |
| 9,321,100 B2 | 4/2016 | Dambrine et al. |
| 9,410,437 B2 | 8/2016 | Paige et al. |
| 9,475,119 B2 | 10/2016 | Cui et al. |
| 9,556,742 B2 | 1/2017 | Parkin et al. |
| 9,689,269 B2 | 6/2017 | Bottome |
| 9,878,501 B2 | 1/2018 | Zatorski et al. |
| 9,914,282 B2 | 3/2018 | Roach et al. |
| 9,945,234 B2 | 4/2018 | Jevons et al. |
| 9,995,164 B2 | 6/2018 | Nishijima et al. |
| 10,294,573 B2 * | 5/2019 | Parkos, Jr. ............... C25D 1/02 |
| 10,619,486 B2 * | 4/2020 | Pouzadoux ............. F01D 5/282 |
| 2006/0188736 A1 | 8/2006 | Luthra et al. |
| 2007/0036658 A1 | 2/2007 | Morris |
| 2007/0202296 A1 | 8/2007 | Chandrasekaran et al. |
| 2008/0273983 A1 | 11/2008 | Clark et al. |
| 2009/0035131 A1 | 2/2009 | McMillan |
| 2009/0269203 A1 | 10/2009 | Care et al. |
| 2010/0054937 A1 | 3/2010 | Beckford et al. |
| 2010/0150707 A1 | 6/2010 | Jevons |
| 2010/0242843 A1 | 9/2010 | Peretti et al. |
| 2010/0296942 A1 | 11/2010 | Jevons |
| 2011/0023301 A1 | 2/2011 | Jones |
| 2011/0027096 A1 | 2/2011 | Northfield |
| 2011/0049297 A1 | 3/2011 | Jevons et al. |
| 2011/0052405 A1 | 3/2011 | Parkin |
| 2011/0129351 A1 | 6/2011 | Das et al. |
| 2011/0182743 A1 | 7/2011 | Naik |
| 2011/0194941 A1 | 8/2011 | Parkin et al. |
| 2011/0217160 A1 | 9/2011 | McMillan |
| 2011/0223027 A1 | 9/2011 | Klinetob et al. |
| 2011/0299990 A1 | 12/2011 | Marra et al. |
| 2012/0003100 A1 | 1/2012 | James et al. |
| 2012/0021243 A1 | 1/2012 | Kray et al. |
| 2012/0028055 A1 | 2/2012 | Schmidt |
| 2012/0034089 A1 | 2/2012 | Wadewitz et al. |
| 2012/0051935 A1 | 3/2012 | Naik et al. |
| 2012/0082556 A1 | 4/2012 | Macchia et al. |
| 2012/0100006 A1 | 4/2012 | Merriman et al. |
| 2015/0218953 A1 | 8/2015 | Bottome |
| 2016/0123159 A1 | 5/2016 | Thompson |
| 2016/0167269 A1 | 6/2016 | Pautard |
| 2017/0226867 A1 | 8/2017 | Nandula et al. |
| 2017/0254207 A1 | 9/2017 | Schetzel et al. |
| 2017/0321714 A1 | 11/2017 | Jain et al. |
| 2017/0335856 A1 | 11/2017 | Lander et al. |
| 2017/0363062 A1 | 12/2017 | Merzhaeuser et al. |
| 2017/0370376 A1 | 12/2017 | Kray et al. |
| 2018/0119551 A1 | 5/2018 | Romero et al. |
| 2018/0178489 A1 | 6/2018 | M'Membe et al. |
| 2019/0003312 A1 * | 1/2019 | Pouzadoux ........... F04D 29/023 |

FOREIGN PATENT DOCUMENTS

| | | |
|---|---|---|
| FR | 2953225 A1 | 6/2011 |
| FR | 2994708 A1 | 2/2014 |
| GB | 2450139 A | 12/2008 |
| JP | 2001041002 A | 2/2001 |
| WO | WO2008122751 A2 | 10/2008 |

* cited by examiner

FRANGIBLE GAS TURBINE ENGINE AIRFOIL

FIELD

The present subject matter relates generally to airfoils, and more particularly, to frangible airfoils for gas turbine engines.

BACKGROUND

Airfoils used in aircraft engines, such as fan blades of a gas turbine engine, can be susceptible to extreme loading events. For instance, a fan blade might strike a bird that is ingested into the engine, or a blade-out occurrence may arise wherein one of the fan blades is severed from a rotor disk. If the impact is large enough, a fan blade may break apart into one or more shards before traveling downstream through the engine.

Gas turbine engines, such as turbofans, generally include fan cases surrounding a fan assembly including the fan blades. The fan cases are generally configured to withstand an impact of the fan blades due to adverse engine conditions resulting in a failure mode, such as foreign object damage, hard rubs due to excessive or extreme unbalance or fan rotor oscillations, or fan blade liberation. However, such airfoil configurations generally increase the weight of the fan case, thereby increasing the weight of the engine and aircraft and reducing performance and efficiency.

Known fan cases generally include frangible structures, such as honeycombs or trench-filler material, configured to mitigate load transfer to and through the fan case. However, this approach is generally costly. Furthermore, this approach may result in larger, heavier, less efficient fan cases. Still further, this approach may not address issues relating to fan rotor unbalance following deformation or liberation of one or several airfoils such as fan blades.

As such, there is a need for an airfoil that enables a controlled and consistent failure mode of the airfoil that may enable reducing a cost, weight, and load transfer to a surrounding casing.

BRIEF DESCRIPTION

Aspects and advantages will be set forth in part in the following description, or may be obvious from the description, or may be learned through practice of the invention.

In one aspect, the present subject matter is directed to an airfoil defining a span extending between a root and a tip and a chord at each point along the span extending between a leading edge and a trailing edge. The airfoil includes a leading edge sheath coupled to the leading edge of the airfoil. The leading edge sheath includes a flange extending from a frangible line toward the tip along the span and defining a first width along the chord at each point along the span. The leading edge sheath further including a base extending from the frangible line at least partially along the span to the root and defining a second width along the chord at a point along the span of the frangible line such that the second width is greater than the first width.

In one embodiment, the airfoil may define a frangible airfoil portion extending between the frangible line and the tip along the span. In one particular embodiment, the airfoil may be a fan blade of a gas turbine engine. In one embodiment, the leading edge sheath and airfoil each may include at least one of a metal, metal alloy, or composite.

In another embodiment, the leading edge sheath may extend along the entire span. In one embodiment, the flange may extend from the frangible line along the span toward the tip to a point along the span within 5% of the span from the tip. In a further embodiment, the flange may extend along at least 5% of the span but less than 25% of the span. In other embodiments, the flange may extend along at least 10% of the span but less than 20% of the span. In a further embodiment, the first width may extend along 10% or less of the chord at each point along the span. In such an embodiment, the second width may extend along at least 10% of the chord but less than 90% of the chord at the point along the span of the frangible line.

In one embodiment, the airfoil may further define a pressure side and a suction side. The base may extend along the second width on both the pressure and suctions side equally. In such an embodiment, the flange may extend along the first width on both the pressure and suction side equally. In another embodiment, the base may extend along the second width on at least one of the pressure or suction sides and less than the second width on the other of the pressure or suction side. In such an embodiment, the flange may extend along the first width on at least one of the pressure or suction sides and less than the first width on the other of the pressure or suction side.

In another aspect, the present subject matter is directed to a gas turbine engine defining a central axis. The gas turbine engine includes an engine shaft extending along the central axis, a compressor attached to the engine shaft and extending radially about the central axis, a combustor positioned downstream of the compressor to receive a compressed fluid therefrom, a turbine mounted on the engine shaft downstream of the combustor to provide a rotational force to the compressor, and a plurality of airfoils operably connected to the engine shaft. Each of the plurality of airfoils defines a span extending between a root and a tip and a chord at each point along the span extending between a leading edge and a trailing edge. Each airfoil includes a leading edge sheath coupled to the leading edge of the airfoil. The leading edge sheath includes a flange extending between from a frangible line toward the tip along the span and defining a first width along the chord at each point along the span. The leading edge sheath further includes a base extending from the frangible line at least partially along the span to the root and defining a second width along the chord at a point along the span of the frangible line such that the second width is greater than the first width.

In one embodiment, the gas turbine engine may further include a fan section including the plurality of airfoils configured as fan blades. It should be further understood that the gas turbine engine may further include any of the additional features as described herein.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended FIGS., in which.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The terms "communicate," "communicating," "communicative," and the like refer to both direct communication as well as indirect communication such as through a memory system or another intermediary system.

A frangible airfoil for gas turbine engines is generally provided. The airfoil may include a leading edge sheath coupled to a leading edge of the airfoil. The leading edge sheath may include a flange positioned toward a tip of the airfoil and a base positioned toward a root of the airfoil. The base may extend farther along a chord of the airfoil than the flange. Further, the flange and base may define a notch and frangible line therebetween. A frangible airfoil portion of the airfoil may be positioned radially outward from the frangible line and include a reduced bending stiffness such that the frangible airfoil portion may break-off or bend during a failure mode of the airfoil. For example, the embodiments generally shown and described herein may enable a controlled and consistent failure of the airfoil, such as a fan blade, following a failure event, such as a hard rub against a surrounding fan case. The embodiments generally described herein enable the airfoil to deform or detach at a desired span of the airfoil to mitigate load transfer to a surrounding casing. The embodiments generally provided herein may further enable the airfoil to deform or detach such that excessive or extreme unbalance of the fan rotor may be reduced following a failure event, such as airfoil liberation, foreign object damage (e.g., bird strikes, icing, etc.), or loss of lube or damper to a bearing assembly.

Figure 1:
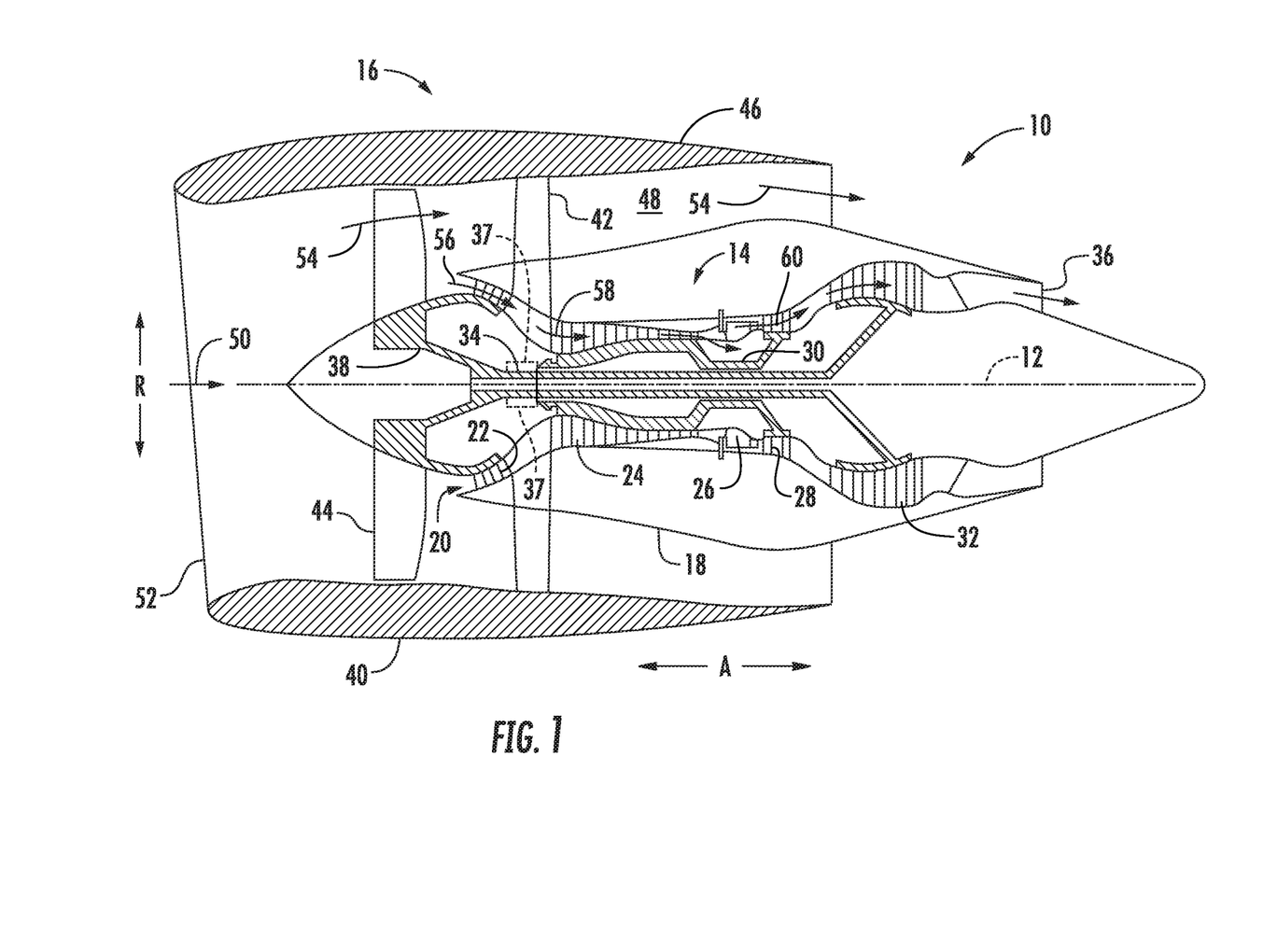
FIG. 1 illustrates a cross-sectional view of one embodiment of a gas turbine engine that may be utilized within an aircraft in accordance with aspects of the present subject matter, particularly illustrating the gas turbine engine configured as a high-bypass turbofan jet engine.

Referring now to the drawings, FIG. 1 illustrates a cross-sectional view of one embodiment of a gas turbine engine 10 that may be utilized within an aircraft in accordance with aspects of the present subject matter. More particularly, for the embodiment of FIG. 1, the gas turbine engine is a high-bypass turbofan jet engine, with the gas turbine engine 10 being shown having a longitudinal or axial centerline axis 12 extending therethrough along an axial direction A for reference purposes. The gas turbine engine 10 further defines a radial direction R extended from the centerline 12. Although an exemplary turbofan embodiment is shown, it is anticipated that the present disclosure can be equally applicable to turbomachinery in general, such as an open rotor, a turboshaft, turbojet, or a turboprop configuration, including marine and industrial turbine engines and auxiliary power units.

In general, the gas turbine engine 10 includes a core gas turbine engine (indicated generally by reference character 14) and a fan section 16 positioned upstream thereof. The core engine 14 generally includes a substantially tubular outer casing 18 that defines an annular inlet 20. In addition, the outer casing 18 may further enclose and support a low pressure (LP) compressor 22 for increasing the pressure of the air that enters the core engine 14 to a first pressure level. A multi-stage, axial-flow high pressure (HP) compressor 24 may then receive the pressurized air from the LP compressor 22 and further increase the pressure of such air. The pressurized air exiting the HP compressor 24 may then flow to a combustor 26 within which fuel is injected into the flow of pressurized air, with the resulting mixture being combusted within the combustor 26. The high energy combustion products are directed from the combustor 26 along the hot gas path of the gas turbine engine 10 to a high pressure (HP) turbine 28 for driving the HP compressor 24 via a high pressure (HP) shaft or spool 30, and then to a low pressure (LP) turbine 32 for driving the LP compressor 22 and fan section 16 via a low pressure (LP) drive shaft or spool 34 that is generally coaxial with HP shaft 30. After driving each of turbines 28 and 32, the combustion products may be expelled from the core engine 14 via an exhaust nozzle 36 to provide propulsive jet thrust.

Figure 2:
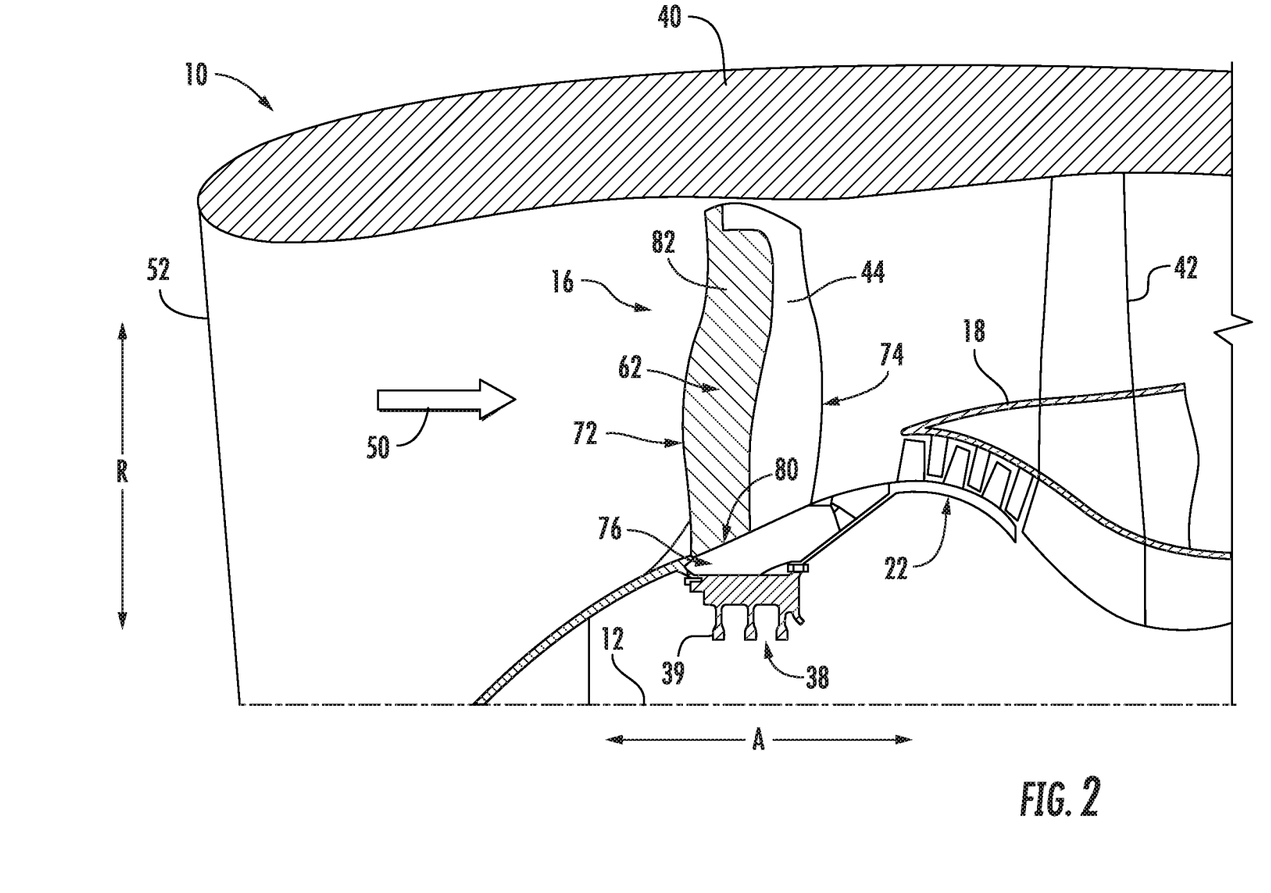
FIG. 2 illustrates a cross-sectional view of the fan section of FIG. 1 in accordance with aspects of the present subject matter, particularly illustrating a fan blade of the fan section.

Additionally, as shown in FIGS. 1 and 2, the fan section 16 of the gas turbine engine 10 generally includes a rotatable, axial-flow fan rotor 38 that configured to be surrounded by an annular fan casing 40. In particular embodiments, the LP shaft 34 may be connected directly to the fan rotor 38 or rotor disk 39, such as in a direct-drive configuration. In alternative configurations, the LP shaft 34 may be connected to the fan rotor 38 via a speed reduction device 37 such as a reduction gear gearbox in an indirect-drive or geared-drive configuration. Such speed reduction devices may be included between any suitable shafts/spools within the gas turbine engine 10 as desired or required.

It should be appreciated by those of ordinary skill in the art that the fan casing 40 may be configured to be supported relative to the core engine 14 by a plurality of substantially radially-extending, circumferentially-spaced outlet guide vanes 42. As such, the fan casing 40 may enclose the fan rotor 38 and its corresponding fan rotor blades (fan blades 44). Moreover, a downstream section 46 of the fan casing 40 may extend over an outer portion of the core engine 14 so as to define a secondary, or by-pass, airflow conduit 48 that provides additional propulsive jet thrust.

During operation of the gas turbine engine 10, it should be appreciated that an initial airflow (indicated by arrow 50) may enter the gas turbine engine 10 through an associated inlet 52 of the fan casing 40. The air flow 50 then passes through the fan blades 44 and splits into a first compressed air flow (indicated by arrow 54) that moves through the by-pass conduit 48 and a second compressed air flow (indicated by arrow 56) which enters the LP compressor 22. The pressure of the second compressed air flow 56 is then increased and enters the HP compressor 24 (as indicated by arrow 58). After mixing with fuel and being combusted within the combustor 26, the combustion products 60 exit the combustor 26 and flow through the HP turbine 28. Thereafter, the combustion products 60 flow through the LP turbine 32 and exit the exhaust nozzle 36 to provide thrust for the gas turbine engine 10.

Figure 3:
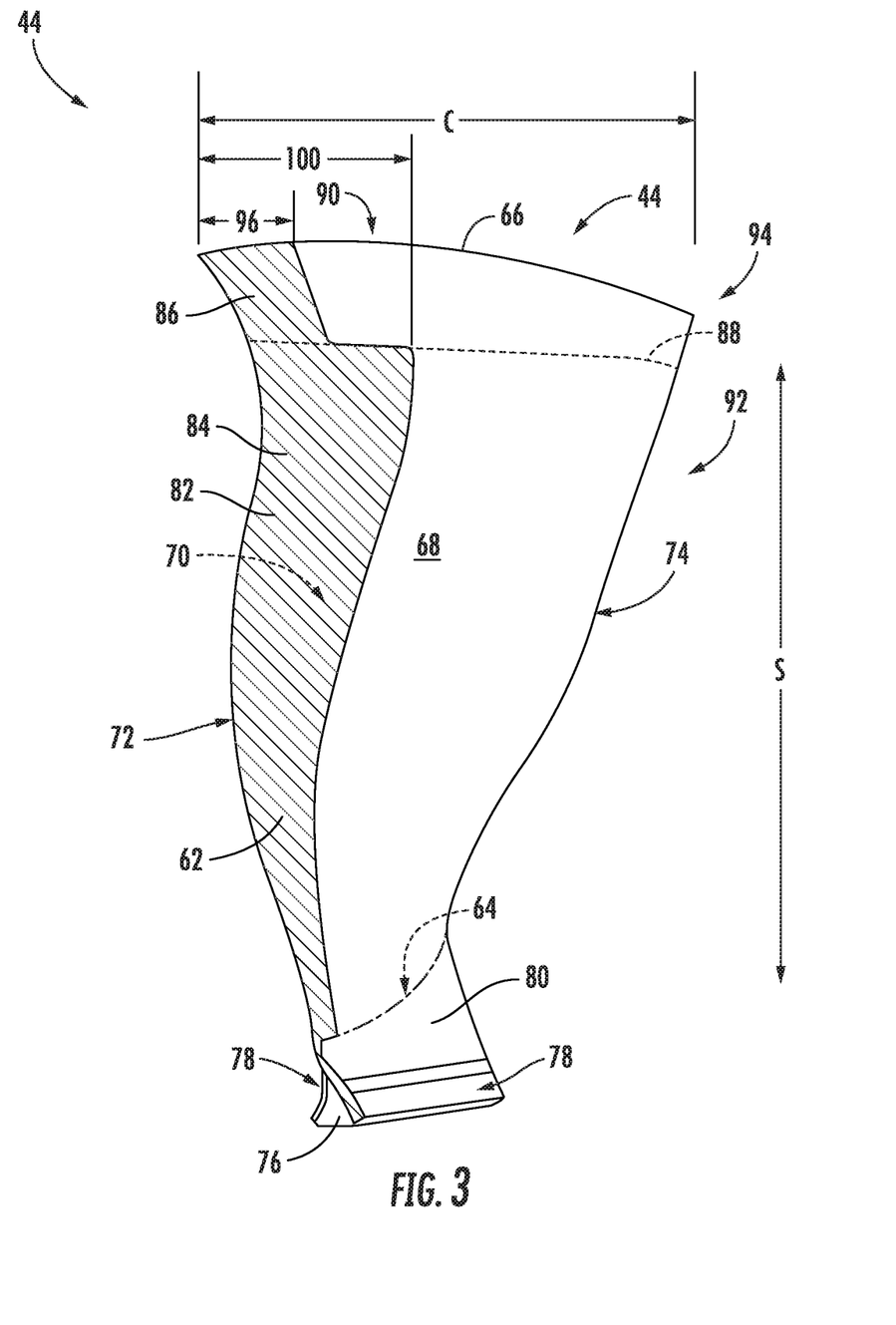
FIG. 3 illustrates a fan blade of the fan section of FIGS. 1 and 2 in accordance with aspects of the present subject matter, particularly illustrating a leading edge sheath.

Referring to FIGS. 2 and 3, exemplary airfoil 62 embodiments are provided in the context of a fan blade 44. Although the illustrated airfoils 62 are shown as part of a fan blade 44, it is understood that the following discussion of an airfoil 62 may be equally applied to another airfoil embodiment, e.g., a stator vane or rotor blade of a compressor 22, 24 and/or turbine 28, 32 (see FIG. 1). As shown, each fan blade 44 extends radially outwardly along a span S from an airfoil root 64 to an airfoil tip 66. A pressure side 68 and a suction side 70 of the airfoil 62 extend from the airfoil's leading edge 72 to a trailing edge 74 and between the airfoil root 64 and airfoil tip 66 along the span S. Further, it should be recognized that airfoil may define a chord C at each point along the span S between the airfoil root 64 and the airfoil tip 66. Further, the chord C may vary along the span of the airfoil 62. For instance, in the depicted embodiment, the chord C increases along the span S toward the airfoil tip 66. Though, in other embodiments, the chord C may be approximately constant throughout the span S or may decrease from the airfoil root 64 to the airfoil tip 66.

Optionally, each fan blade 44 includes an integral component having an axial dovetail 76 with a pair of opposed pressure faces 78 leading to a transition section 80. When mounted within the gas turbine engine 10, as illustrated in FIG. 2, the dovetail 76 is disposed in a dovetail slot of the fan rotor disk 39, thereby attaching the fan blades 44 to the fan rotor 38.

In the depicted embodiment, the airfoil 62 may include a leading edge sheath 82 including a base 84 and flange 86 coupled to the leading edge 72 of the airfoil 62. For example, as illustrated, the leading edge sheath 82 may extend from the airfoil tip 66 along at least a portion of the span S of the airfoil 62. For instance, the leading edge sheath 82 may be bonded to and provide protection for the leading edge 72 of the airfoil 62. It should be recognized that the leading edge sheath 82 may be coupled to the leading edge 72 suing any suitable means, such as by adhesives, tape, welding, and/or mechanical fasteners (e.g., bolts, screws, and rivets). The leading edge sheath 82 may generally strengthen the airfoil 62, minimize danger to the airfoil 62 (e.g., the fan blade 44) during a fan blade out event, and protect the airfoil 62 from foreign object damage.

In one embodiment, the leading edge sheath 82 may extend along the entire span S. As such, the leading edge sheath 82 may protect the entire leading edge 72 of the airfoil 62 from the airfoil root 64 to the airfoil tip 66. In other embodiments, the leading edge sheath 82 may protect only a portion of the leading edge 72 of the airfoil 62, such as a portion of the leading edge 72 toward the airfoil tip 66.

The leading edge sheath 82 may include the base 84 and the flange 86 meeting at a frangible line 88. As illustrated, the base 84 and the flange 86 may defining a notch 90 therebetween. More particularly, the position where the flange 86 and the base 84 meet at the notch 90 may define the frangible line 88. For example, the notch 90 may be defined relative to a difference in a first width 96 of the flange 86 and a second width 100 of the base 84 as described in more detail in regards to FIGS. 4 and 5. Further, the frangible line 88 may generally extend along the chord C toward the trailing edge 74. It should be recognized that the frangible line 88 may generally extend along the chord C at approximately the same point along the span S. In other embodiments, the frangible line 88 may at least partially extend radially inward or outward (e.g., along the span S) as the frangible line 88 extends axially along the chord C toward the trailing edge 74. In one embodiment, the airfoil 62 may define a residual airfoil portion 92 extending from the root 64 to the frangible line 88 along the span S of the airfoil 62. In such an embodiment, the airfoil 62 may further define a frangible airfoil portion 94 extending from the airfoil tip 66 to the frangible line 88 along the span S of the airfoil 62. The frangible airfoil portion 94 may meet the residual airfoil portion 90 at the frangible line 88. Additionally, the notch 90 may at least partially define the frangible airfoil portion 92. The frangible airfoil portion 94 may have a reduced overall bending stiffness compared to the residual airfoil portion 92, as described in more detail in regards to FIGS. 4 and 5.

Still referring to the exemplary airfoil 62 of FIG. 3, the airfoil 62 may be configured to fracture, break, or liberate at approximately the frangible line 88 up to the airfoil tip 66 (e.g., the frangible airfoil portion) following a loading or impact upon the airfoil 62. For example, the airfoil 62 configured as the fan blade 44 within the fan casing 40 or nacelle of the gas turbine engine 10 (FIG. 1) may be configured to detach, decouple, deform, break, or liberate the frangible airfoil portion 94 of the airfoil 62 above the frangible line 88. In one non-limiting example, the frangible airfoil portion 94 of the airfoil 62 may be defined as the difference in spanwise dimensions of the frangible airfoil portion 94 and the residual airfoil 92. For example, the frangible airfoil portion 94 may be defined within approximately 3% to approximately 15% of the total span S from the airfoil tip 66.

Figure 4:
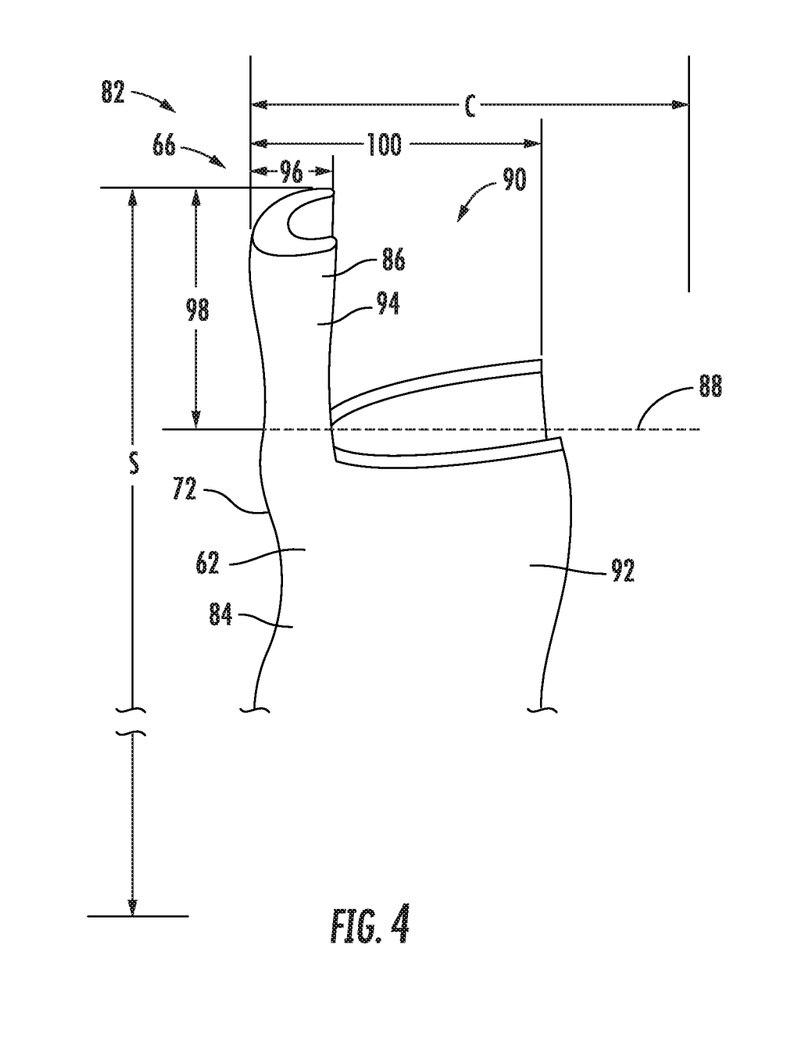
FIG. 4 illustrates one embodiment of the leading edge sheath in accordance with aspects of the present subject matter, particularly illustrating a base and flange of the leading edge sheath.
Figure 5:
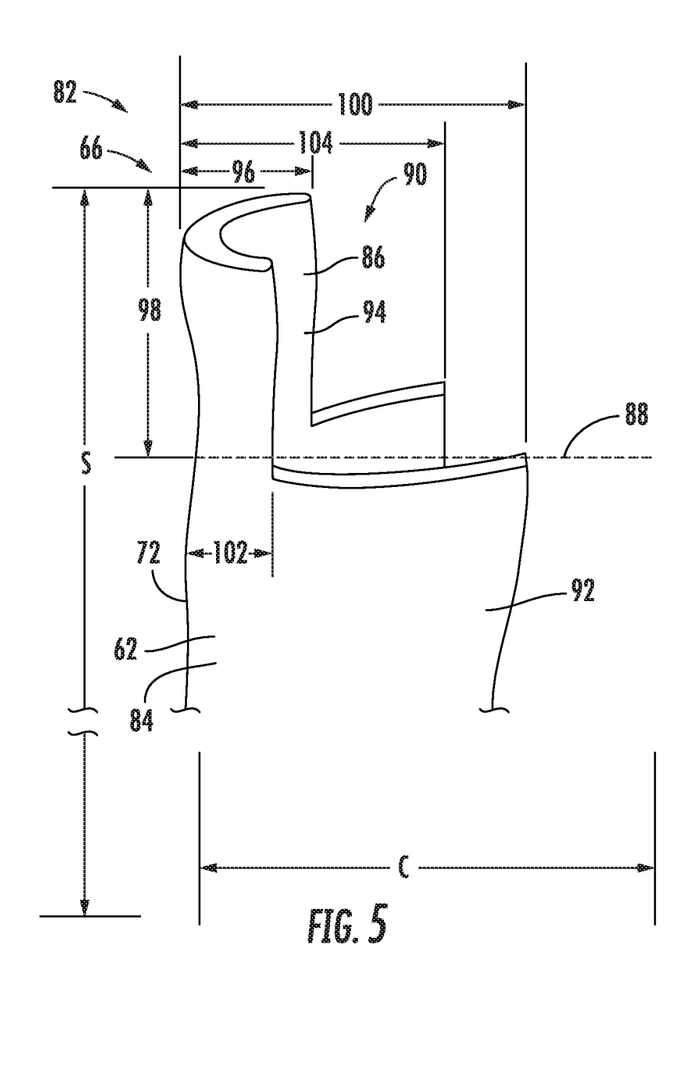
FIG. 5 illustrates another embodiment of the leading edge sheath in accordance with aspects of the present subject matter, particularly illustrating a non-symmetrical leading edge sheath.

During operation of the gas turbine engine 10, such as following an event generating substantial imbalance in the fan rotor 38 or LP shaft 34, the frangible airfoil portion 94, e.g., of the fan blade 44, as shown and described in various embodiments in FIGS. 3-5 may be configured to deform or partially or fully detach from the remainder of the airfoil 62, e.g., along the frangible line 88. Further, the frangible airfoil portion 94 may detach (e.g., along the frangible line 88) while leaving all of or at least a portion of the residual airfoil portion 92. Events generating substantial unbalance in the fan rotor 38 and/or LP shaft 34 may include, but are not limited to, foreign object damage (e.g., bird strikes, ice ingestion, other debris, etc.) or fan blade 44 detachment. Detaching or decoupling the frangible airfoil portion 94 may reduce undesired unbalance or vibrations as the fan rotor 38 and/or LP shaft 36 continue to rotate. Furthermore, the embodiments of the airfoil 62 generally shown and described in regard to FIGS. 3-5 may enable a lighter fan casing 44 or nacelle, such as reducing an amount of metal materials or abradable material of the fan casing 40 or nacelle.

Referring now to FIG. 4, one embodiment of the leading edge sheath 82 is illustrated according to aspects of the present subject matter. Particularly, FIG. 4 illustrates the base 84 and the flange 86 of the leading edge sheath 82 with the remaining components of the airfoil 62 omitted for clarity. For example, the leading edge sheath 82 may include the flange 86 extending from the frangible line 88 toward the airfoil tip 66 along the span S. It should be appreciated that, in other embodiments, the flange 86 may not extend fully to the airfoil tip 66, such as shown in FIG. 5. For instance, the flange 86 may extend from the frangible line 88 along the span S to a point along the span S within 5% of the span S from the airfoil tip 66. Further, the flange 86 may define a first width 96 along the chord C at each point along the span S (e.g., with the flange 86). In a certain embodiments, the first width 96 may extend along 10% or less of the chord C at each point along the span S. In one embodiment, the flange 86 may define a flange height 98 extending along at least 5% of the span S but less than 25% of the span S. In other embodiments, the flange height 98 of the flange 96 may extend along at least 10% of the span S but less than 20% of the span S. As such, it should be recognize that the notch 90 and/or the frangible airfoil portion 94 may also extend along the flange height 98 between the airfoil tip 66 and the frangible line 88. Or more particularly, the flange 96 may define both the frangible airfoil portion 94 and the notch 90 such that they each have a height that is the same as or approximately the same as the flange height 98.

The leading edge sheath 82 may further include the base 84 extending from the frangible line 88 at least partially along the span S to the airfoil root 64 (FIG. 3). In embodiments where the leading edge sheath 82 extends along the full span S of the leading edge 72 (FIG. 3), the base 84 may extend the full distance between the frangible line 88 and the airfoil root 64. Further, the base 84 may define a second width 100 along the chord C at the point along the span S of the frangible line 88 such that the second width 100 is greater than the first width 96. As described herein, the second width 100 greater than the first width 96 refers to a first width 96 that extends along less of a percentage of the chord C at each point along the span S of the flange 86 than the percentage of the chord C that the second width 100 of the base 84 extends at the point along the span S of the frangible line 88. In certain embodiments, the second width 100 may extend along at least 10% of the chord C at the point along the span of the frangible line 88 but less than 90% of such chord C. For instance, the base 84 may cover the pressure side 68 and suctions side 70 within proximity of the trailing edge 74, such as a distance approximately 10% of the chord C away from the trailing edge 74 at the point along the span S of the frangible line 88. As such, it should be recognized that, in the illustrated embodiment, the base 84 extends farther along the chord C at the point along the span S of the frangible line 88 than the flange 86 extends along the chord C at each point along the span S.

In certain embodiments, the base 84 may define a portion of the airfoil 62 with a first overall bending stiffness (e.g., the residual airfoil portion 92). Similarly, the flange 66 may define a portion of the airfoil 62 with a second overall bending stiffness (e.g., the frangible airfoil portion 94) less than the first overall bending stiffness of the residual airfoil portion 94. For instance, the notch 90 may reduce an amount of the leading edge sheath 82 above the frangible line 88 along the span S and the chord C. As such, the frangible airfoil portion 94 may have a reduced stiffness allowing the frangible airfoil portion 94 to fracture, break, liberate, decouple, deform, deflect, etc. at the frangible line 88 as described in regards to FIG. 3 above.

Still referring to the embodiment of FIG. 4, the leading edge sheath 82 may be symmetrical about the leading edge 72. For example, in such an embodiment, the flange 86 may extend along the first width 96 on both the pressure and suction side 68, 70 (FIG. 3) equally. For instance, the flange 86 may provide protection equally on both sides of the leading edge 72. Further, the base 84 may extend along the second width 100 on both the pressure and suction sides 68, 70 equally.

Referring now to FIG. 5, another embodiment of the leading edge sheath 82 is illustrated according to aspects of the present subject matter. Particularly, FIG. 5 illustrates a non-symmetrical leading edge sheath 82. For instance, the flange 86 may extend along the first width 96 on at least one of the pressure or suction sides 68, 70 (FIG. 3) and less than the first width 96 on the other of the pressure or suction side 68, 70. More particularly, the flange 96 may extend along a third width 102 along one of the pressure or suctions sides 68, 70 less than the first width 96.

As such, the flange 86 may be non-symmetrical around the leading edge 72 of the airfoil 62. For instance, the flange 86 of the leading edge sheath 82 may extend along the chord C at each point along the span S farther on the pressure side 68 (e.g., 10%) than on the suction side 70 (e.g., 5%). For example, the leading edge sheath 82 may not extend to the full first width 96 toward direction the airfoil 62 is intended to bend and/or break. In another embodiment, the base 84 may extend along the second width 100 on at least one of the pressure or suction sides 68, 70 and less than the second width 100 on the other of the pressure or suction side 68, 70. For instance, the base 84 may extend along a fourth width 104 on one of the sides 68, 70 at the point along the span S of the frangible line 88 less than the second width 100. In certain embodiments, the fourth width 104 may be greater than the first width 96. Though, in other embodiments, the fourth width 104 may be less than the first width 96 but greater than the third width 102. As such, the base 84 may be non-symmetrical around the leading edge 72 of the airfoil 62.

It should be recognized that, in certain embodiments, both the flange 86 and the base 84 may extend along the first width 96 and second width 100, respectively, on one of the pressure or suction side 68, 70 and less than the first width 96 and second width 100 on the other side 68, 70. Though, in still further embodiments, the flange 86 may extend less than the first width 96 (the third width 102) on one side, such as the suction side 70, and the base 84 may extend less than the second width 100 (the fourth width 104) on the other side, such as the pressure side 68. For instance, the base 84 may extend farther on the side the frangible airfoil portion 94 is intended to bend and/or break, thereby providing more protection to the airfoil 62 in the event of a failure mode. Similarly, the flange 86 may extend farther on the opposite side the frangible airfoil portion 94 is intended to bend and/or break, thereby providing more protection to the side of the airfoil 62 that may rub against the fan casing 40, e.g., the pressure side 68.

In one embodiment, the airfoil 62 and/or leading edge sheath 82 may include at least one of a metal, metal alloy, or composite. For instance, the airfoil 62 and/or leading edge sheath 82 may be formed at least partially from a ceramic matrix composite. More particularly, in certain embodiments, the airfoil 62 and leading edge sheath 82 may be formed from one or more ceramic matrix composite prepreg plies. For instance, such prepreg plies forming the leading edge sheath 82 may be wrapped around the leading edge 72 of the airfoil 62 and cured and processed to form the leading edge sheath 82. In other embodiments, the airfoil 62 and/or leading edge sheath 82 may be formed at least partially from a metal, such as but not limited to, steel, titanium, aluminum, nickel, or alloys of each. For instance, in certain embodiments, the airfoil 62 and/or leading edge sheath 82 may be cast. In one particular embodiment, the airfoil 62 may be formed from a ceramic matric composite while the leading edge sheath 82 may be formed from a metal. Though, it should be recognized that the airfoil 62 and/or leading edge sheath 82 may be formed from multiple materials, such as a combination of metals, metal alloys, and/or composites. For example, the flange 86 may include one material while the base 84 includes another material. Further, in such an embodiment, the flange 86 and base 84 may be bonded at the frangible line 88. Similarly, the residual airfoil portion 90 may include one material while the frangible airfoil portion 94 includes another material bonded with the residual airfoil portion 90 at the frangible line 88. It should be recognized that the materials forming the flange 86 and/or frangible airfoil portion 94 may have a reduced stiffness comparted to the materials forming the base 84 and the residual airfoil portion 92.

Composite materials may include, but are not limited to, metal matrix composites (MMCs), polymer matrix composites (PMCs), or ceramic matrix composites (CMCs). Composite materials, such as may be utilized in the airfoil 62 and/or leading edge sheath 82, generally comprise a fibrous reinforcement material embedded in matrix material, such as polymer, ceramic, or metal material. The reinforcement material serves as a load-bearing constituent of the composite material, while the matrix of a composite material serves to bind the fibers together and act as the medium by which an externally applied stress is transmitted and distributed to the fibers.

Exemplary CMC materials may include silicon carbide (SiC), silicon, silica, or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAIVIIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). For example, in certain embodiments, bundles of the fibers, which may include a ceramic refractory material coating, are formed as a reinforced tape, such as a unidirectional reinforced tape. A plurality of the tapes may be laid up together (e.g., as plies) to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition. In other embodiments, the CMC material may be formed as, e.g., a carbon fiber cloth rather than as a tape.

Similarly, in various embodiments, PMC materials may be fabricated by impregnating a fabric or unidirectional tape with a resin (prepreg), followed by curing. For example, multiple layers of prepreg may be stacked to the proper thickness and orientation for the part, and then the resin may be cured and solidified to render a fiber reinforced composite part. As another example, a die may be utilized to which the uncured layers of prepreg may be stacked to form at least a portion of the composite component. The die may be either a closed configuration (e.g., compression molding) or an open configuration that utilizes vacuum bag forming. For instance, in the open configuration, the die forms one side of the blade (e.g., the pressure side 68 or the suction side 70). The PMC material is placed inside of a bag and a vacuum is utilized to hold the PMC material against the die during curing. In still other embodiments, the airfoil 62 and/or leading edge sheath 82 may be at least partially formed via resin transfer molding (RTM), light resin transfer molding (LRTM), vacuum assisted resin transfer molding (VARTM), a forming process (e.g. thermoforming), or similar.

Prior to impregnation, the fabric may be referred to as a "dry" fabric and typically comprises a stack of two or more fiber layers (plies). The fiber layers may be formed of a variety of materials, non-limiting examples of which include carbon (e.g., graphite), glass (e.g., fiberglass), polymer (e.g., Kevlar®) fibers, and metal fibers. Fibrous reinforcement materials can be used in the form of relatively short chopped fibers, generally less than two inches in length, and more preferably less than one inch, or long continuous fibers, the latter of which are often used to produce a woven fabric or unidirectional tape. Other embodiments may include other textile forms such as plane weave, twill, or satin.

In one embodiment, PMC materials can be produced by dispersing dry fibers into a mold, and then flowing matrix material around the reinforcement fibers. Resins for PMC matrix materials can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermosplastic resins include nylons, thermoplastic polyesters, polyaryletherketones, and polycarbonate resins. Specific examples of high performance thermoplastic resins that have been contemplated for use in aerospace applications include polyetheretherketone (PEEK), polyetherketoneketone (PEKK), polyetherimide (PEI), and polyphenylene sulfide (PPS). In contrast, once fully cured into a hard rigid solid, thermoset resins do not undergo significant softening when heated but, instead, thermally decompose when sufficiently heated. Notable examples of thermoset resins include epoxy, bismaleimide (BMI), and polyimide resins.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An airfoil defining a span extending between a root and a tip and a chord at each point along the span between a leading edge and a trailing edge, the airfoil comprising:
    a leading edge sheath coupled to the leading edge of the airfoil, the leading edge sheath comprising a flange extending from a frangible line toward the tip along the span and defining a first width along the chord at each point along the span, and wherein the leading edge sheath further comprises a base extending from the frangible line at least partially along the span toward the root and defining a second width along the chord at a point along the span of the frangible line such that the second width is greater than the first width.

2. The airfoil of claim 1, wherein the airfoil defines a frangible airfoil portion extending between the frangible line and tip along the span.

3. The airfoil of claim 1, wherein the airfoil is a fan blade of a gas turbine engine.

4. The airfoil of claim 1, wherein the leading edge sheath extends along the entire span.

5. The airfoil of claim 1, wherein the flange extends from the frangible line along the span toward the tip to a point along the span within 5% of the span from the tip.

6. The airfoil of claim 1, wherein the flange extends along at least 5% of the span but less than 25% of the span.

7. The airfoil of claim 1, wherein the flange extends along at least 10% of the span but less than 20% of the span.

8. The airfoil of claim 1, wherein the first width extends along 10% or less of the chord at each point along the span, and wherein the second width extends along at least 10% of the chord but less than 90% of the chord at the point along the span of the frangible line.

9. The airfoil of claim 1, wherein the leading edge sheath and airfoil each comprise at least one of a metal, metal alloy, or composite.

10. The airfoil of claim 1, wherein the airfoil further defines a pressure side and a suction side, wherein the base extends along the second width on both the pressure and suction sides equally, and wherein the flange extends along the first width on both the pressure and suction sides equally.

11. The airfoil of claim 1, wherein the airfoil further defines a pressure side and a suction side, wherein the base extends along the second width on at least one of the pressure or suction sides and less than the second width on the other of the pressure or suction side, and wherein the flange extends along the first width on at least one of the pressure or suction sides and less than the first width on the other of the pressure or suction side.

12. A gas turbine engine defining a central axis, the gas turbine engine comprising:
    an engine shaft extending along the central axis;
    a compressor attached to the engine shaft and extending radially about the central axis;
    a combustor positioned downstream of the compressor to receive a compressed fluid therefrom;
    a turbine mounted on the engine shaft downstream of the combustor to provide a rotational force to the compressor; and
    a plurality of airfoils operably connected to the engine shaft, each of the plurality of airfoils defining a span extending between a root and a tip and a chord at each point along the span extending between a leading edge and a trailing edge, each airfoil comprising:
        a leading edge sheath coupled to the leading edge of the airfoil, the leading edge sheath comprising a flange extending from a frangible line toward the tip along the span and defining a first width along the chord at each point along the span, and wherein the leading edge sheath further comprises a base extending from the frangible line at least partially along the span toward the root and defining a second width along the chord at a point along the span of the frangible line such that the second width is greater than the first width.

13. The airfoil of claim 12, wherein each airfoil defines a frangible airfoil portion extending between the frangible line and tip along the span.

14. The gas turbine engine of claim 12, further comprising a fan section including the plurality of airfoils configured as fan blades.

15. The gas turbine engine of claim 12, wherein each leading edge sheath extends along the entire span.

16. The gas turbine engine of claim 12, wherein each flange extends along at least 5% of the span but less than 25% of the span.

17. The gas turbine engine of claim 12, wherein each flange extends along at least 10% of the span but less than 20% of the span.

18. The gas turbine engine of claim 12, wherein the first width extends along 10% or less of the chord at each point along the span, and wherein the second width extends along at least 10% of the chord but less than 90% of the chord at the point along the span of the frangible line.

19. The gas turbine engine of claim 12, wherein each airfoil further defines a pressure side and a suction side, wherein each base extends along the second width on both the pressure and suction sides equally, and wherein each flange extends along the first width on both the pressure and suction sides equally.

20. The gas turbine engine of claim 12, wherein each airfoil further defines a pressure side and a suction side, wherein each base extends along the second width on at least one of the pressure or suction sides and less than the second width on the other of the pressure or suction side, and wherein each flange extends along the first width on at least one of the pressure or suction sides and less than the first width on the other of the pressure or suction side.

* * * * *